United States Patent
Mizikovsky et al.

(10) Patent No.: US 9,537,663 B2
(45) Date of Patent: Jan. 3, 2017

(54) MANIPULATION AND RESTORATION OF AUTHENTICATION CHALLENGE PARAMETERS IN NETWORK AUTHENTICATION PROCEDURES

(75) Inventors: Semyon Mizikovsky, Morganville, NJ (US); Ioannis Broustis, Millburn, NJ (US); Violeta Cakulev, Millburn, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 169 days.

(21) Appl. No.: 13/528,802

(22) Filed: Jun. 20, 2012

(65) Prior Publication Data
US 2013/0343538 A1 Dec. 26, 2013

(51) Int. Cl.
H04L 9/32 (2006.01)
H04W 12/06 (2009.01)
H04L 29/06 (2006.01)

(52) U.S. Cl.
CPC ......... H04L 9/3271 (2013.01); H04L 63/0853 (2013.01); H04W 12/06 (2013.01)

(58) Field of Classification Search
CPC ........ H04L 63/08; H04L 63/0853; H04L 9/32; H04L 9/3234; H04L 9/3271; H04W 12/06
(Continued)

(56) References Cited

U.S. PATENT DOCUMENTS 5,481,611 A * 1/1996 Owens .................. H04W 12/06
713/159

5,887,253 A * 3/1999 O'Neil .................. H04W 8/265
455/410
(Continued)

FOREIGN PATENT DOCUMENTS

JP 2005537713 8/2005
JP 2006033765 2/2006
(Continued)

OTHER PUBLICATIONS

3rd Generation Partnership Project, "Technical Specification Group Services and System Aspects; Feasibility Study on the Security Aspects of Remote Provisioning and Change of Subscription for Machine to Machine (M2M) Equipment (Release 9), 3GPP TR 33.812 V9.2.0," *3GPP Standard*, Jun. 22, 2010, XP050441986.
(Continued)

*Primary Examiner* — Zachary A Davis
(74) *Attorney, Agent, or Firm* — Tong, Rea, Bentley & Kim, LLC

(57) ABSTRACT

A challenge manipulation and restoration capability is provided for use during network authentication. A mobile device (MD) and a subscriber server (SS) each have provisioned therein a binding key (B-KEY) that is associated with a subscriber identity of a network authentication module (NAM) of the MD. The SS obtains an authentication vector (AV) in response to a request from a Radio Access Network (RAN) when the MD attempts to attach to the RAN. The AV includes an original authentication challenge parameter (ACP). The SS encrypts the original ACP based on its B-KEY, and updates the AV by replacing the original ACP with the encrypted ACP. The MD receives the encrypted ACP, and decrypts the encrypted ACP based on its B-KEY to recover the original ACP. The MD provides the original ACP to the NAM for use in computing an authentication response for validation by the RAN.

8 Claims, 4 Drawing Sheets

(58) Field of Classification Search
USPC .......... 380/277, 270; 713/168; 455/410, 411
See application file for complete search history.

(56) References Cited

U.S. PATENT DOCUMENTS

| | | | |
|---|---|---|---|
| 5,953,652 A * | 9/1999 | Amin ................ | H04L 63/1408 455/410 |
| 6,427,073 B1 * | 7/2002 | Kortesalmi .......... | H04W 12/06 455/411 |
| 7,155,526 B2 | 12/2006 | Chaudhary et al. | |
| 7,190,793 B2 | 3/2007 | Hsu | |
| 7,194,765 B2 | 3/2007 | Blom | |
| 7,272,381 B2 | 9/2007 | Aura | |
| 7,274,950 B2 | 9/2007 | Castrogiovanni et al. | |
| 7,308,431 B2 | 12/2007 | Asokan et al. | |
| 7,328,030 B2 | 2/2008 | Laursen | |
| 7,398,550 B2 | 7/2008 | Zick et al. | |
| 7,472,273 B2 | 12/2008 | Haverinen | |
| 7,660,417 B2 * | 2/2010 | Blom ................ | H04L 63/0428 380/247 |
| 7,844,834 B2 * | 11/2010 | Leone ................ | H04L 63/0428 380/273 |
| 7,900,242 B2 | 3/2011 | Malinen et al. | |
| 8,027,666 B2 | 9/2011 | Xie et al. | |
| 8,170,528 B2 * | 5/2012 | Montz ................ | H04L 63/083 455/410 |
| 8,346,287 B2 * | 1/2013 | King .................. | H04L 63/062 380/249 |
| 8,385,953 B2 * | 2/2013 | Engelhart ............ | H04L 12/00 455/414.4 |
| 8,503,376 B2 | 8/2013 | Cha et al. | |
| 8,571,218 B2 * | 10/2013 | Imming .............. | H04L 9/0656 380/247 |
| 8,689,012 B1 * | 4/2014 | Bierbaum ............ | G06F 11/30 705/64 |
| 8,724,819 B2 * | 5/2014 | Asokan .............. | H04L 63/0853 380/278 |
| 9,112,905 B2 * | 8/2015 | Mao .................. | H04L 63/162 |
| 9,154,310 B1 * | 10/2015 | Walsh ................ | G06F 21/44 |
| 2006/0120531 A1 | 6/2006 | Semple et al. | |
| 2006/0129848 A1 | 6/2006 | Paksoy et al. | |
| 2006/0291660 A1 * | 12/2006 | Gehrmann et al. ......... | 380/277 |
| 2008/0070549 A1 * | 3/2008 | Wang ................ | H04L 63/06 455/411 |
| 2009/0217048 A1 | 8/2009 | Smith | |
| 2009/0222669 A1 | 9/2009 | Huang et al. | |
| 2009/0319774 A1 | 12/2009 | Tan | |
| 2010/0135491 A1 | 6/2010 | Bhuyan | |
| 2011/0004754 A1 * | 1/2011 | Walker et al. ............... | 713/168 |
| 2011/0296494 A1 | 12/2011 | Muller et al. | |
| 2012/0260095 A1 | 10/2012 | Von Hauck et al. | |
| 2013/0227658 A1 | 8/2013 | Leicher et al. | |

FOREIGN PATENT DOCUMENTS

| | | |
|---|---|---|
| JP | 2006217064 | 8/2006 |
| JP | 2011/223495 | 11/2011 |
| WO | WO 2008/151663 | 12/2008 |

OTHER PUBLICATIONS

3rd Generation Partnership Project, "Technical Specification Group Services and System Aspects; Study on Facilitating Machine to Machine Communication in 3GPP Systems (Release 8), 3GPP TR 22.868 V8.0.0," *3GPP Standard*, Mar. 1, 2007, XP050361381.

3rd Generation Partnership Project, "Technical Specification Group Services and System Aspects; Service Requirements for Machine-Type Communications (MTC); Stage 1 (Release 10), 3GPP TS 22.368 V10.5.0," *3GPP Standard*, Jun. 20, 2011, XP050553359.

International Search Report and Written Opinion for International Application Serial No. PCT/US2013/046310, dated Oct. 4, 2013, consists of 10 unnumbered pages.

International Search Report and Written Opinion for International Patent Application Serial No. PCT/US2013/070726, mailed Feb. 26, 2014, consists of 11 unnumbered pages.

"3rd Generation Partnership Project; Technical Specification Group Services and System Aspects; Security Aspects of Machine-Type and other Mobile Data Applications Communications Enhancements; (Release 12)," *3GPP Standard; 3GPP TR 33.868*, Sep. 2012, vol. SA WG3, No. V0.10.0, pp. 1-55, XP050649233.

Third Generation Partnership Project, "3GPP TS 33.102, V11.0.0, 3rd Generation Partnership Project; Technical Specification Group Services and System Aspects; 3G Security; Security architecture (Release 11)," Sep. 2011.

Third Generation Partnership Project, "3GPP TS 33.401, V11.0.0, 3rd Generation Partnership Project; Technical Specification Group Services and System Aspects; 3GPP System Architecture Evolution (SAE); Security architecture (Release 11)," Jun. 2011.

Third Generation Partnership Project, "3GPP TS 31.101, V8.0.0, 3rd Generation Partnership Project; Technical Specification Group Core Network and Terminals; UICC-terminal interface; Physical and logical Characteristics (Release 8)," Jan. 2009.

Third Generation Partnership Project, "3GPP TR 33.868, V0.8.0, 3rd Generation Partnership Project; Technical Specification Group Services and System Aspects; Security Aspects of Machine-Type Communications; (Release 11)," May 2012.

Third Generation Partnership Project, "3GPP TS 22.368, V10.4.0, 3rd Generation Partnership Project; Technical Specification Group Services and System Aspects; Service Requirements for Machine-Type Communications (MTC); Stage 1; (Release 11)," Mar. 2011.

Third Generation Partnership Project 2, "3GPP2 S.P0146-0 Version 0.50, Machine-to-Machine Communication System Requirements, Stage 1 Requirements," Feb. 23, 2012.

Mizikovsky et al., "CDMA 1x EV-DO Security," Bell Labs Technical Journal 11(4), pp. 289-303, 2007.

National Institute of Standards and Technology, "Secure Hash Standard," Federal Information Processing Standards Publication 180-2, Aug. 1, 2002.

Open Mobile Alliance, "Device Management Requirements, Candidate Version 1.3," Mar. 6, 2012.

ETSI, "ETSI TS 102 690, V1.1.1, Technical Specification: Machine-to-Machine Communications (M2M); Functional Architecture," Oct. 2011.

3GPP TS 33.102 v11.4.0 (Sep. 2012), 3rd Generation Partnership Project; Technical Specification Group Services and System Aspects; 3G Security; Security architecture (Release 11), Sep. 19, 2012.

Niemi et al., RFC3310, Network Working Group, "Hypertext Transfer Protocol (HTTP) Digest Authentication Using Authentication and Key Agreement (AKA)," Sep. 2002, pp. 1-18.

Nawaz, Omer, Gehrmann, Christian; Fiedler, Markus, "Secure Mobile Social Networks Using USIM in a Closed Environment", 2012 International Conference for Internet Technology and Secured Transactions, Dec. 10-12, 2012, pp. 439-446. hup://ieeexplore.ieee.org/stamp/stamp.jsp?to=&arnumber=6470846.

Chen, W., Hancke, G.P.; Mayes, K.E., Lien, Y., Chiu, J-H, "NFC Mobile Transactions and Authentication based on GSM Network", 2010 Second International Workshop on Near Field Communication (NFC), Apr. 20, 2010, pp. 83-89. http://ieeexplore.ieee.org/stamp/stamp.jsp?tp=&arnumber=5476457.

Computer Desktop Encyclopedia definition of "processor": htt;://lookup.computerlanguage.com/host¯app/search?cid-C999999 &term-processor&lookup.x=0&lookup.y-0.

* cited by examiner

MANIPULATION AND RESTORATION OF AUTHENTICATION CHALLENGE PARAMETERS IN NETWORK AUTHENTICATION PROCEDURES

TECHNICAL FIELD

The invention relates generally to communication networks and, more specifically but not exclusively, to network authentication procedures for communication networks.

BACKGROUND

In many types of networks, security and authentication capabilities are utilized to prevent network access by unauthorized devices.

SUMMARY

Various deficiencies in the prior art are addressed by embodiments for restricting the use of subscribed network access to a specific authorized device through manipulation and restoration of an authentication challenge parameter.

In one embodiment, an apparatus includes a processor and a memory that is communicatively connected to the processor, where the processor is configured to receive an authentication challenge parameter and determine whether the authentication challenge parameter is encrypted.

In one embodiment, a method for use by a mobile device comprising a processor and a memory includes receiving, by the processor, an authentication challenge parameter and determining whether the authentication challenge parameter is encrypted.

In one embodiment, an apparatus includes a processor and a memory that is communicatively connected to the processor, where the processor is configured to encrypt an original authentication challenge parameter of an authentication vector (AV), based on a binding key, to form an encrypted authentication challenge parameter and replace the original authentication challenge parameter of the AV with the encrypted authentication challenge parameter.

In one embodiment, a method includes encrypting, using a processor, an original authentication challenge parameter of an authentication vector (AV), based on a binding key, to form an encrypted authentication challenge parameter, and replacing the original authentication challenge parameter of the AV with the encrypted authentication challenge parameter.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
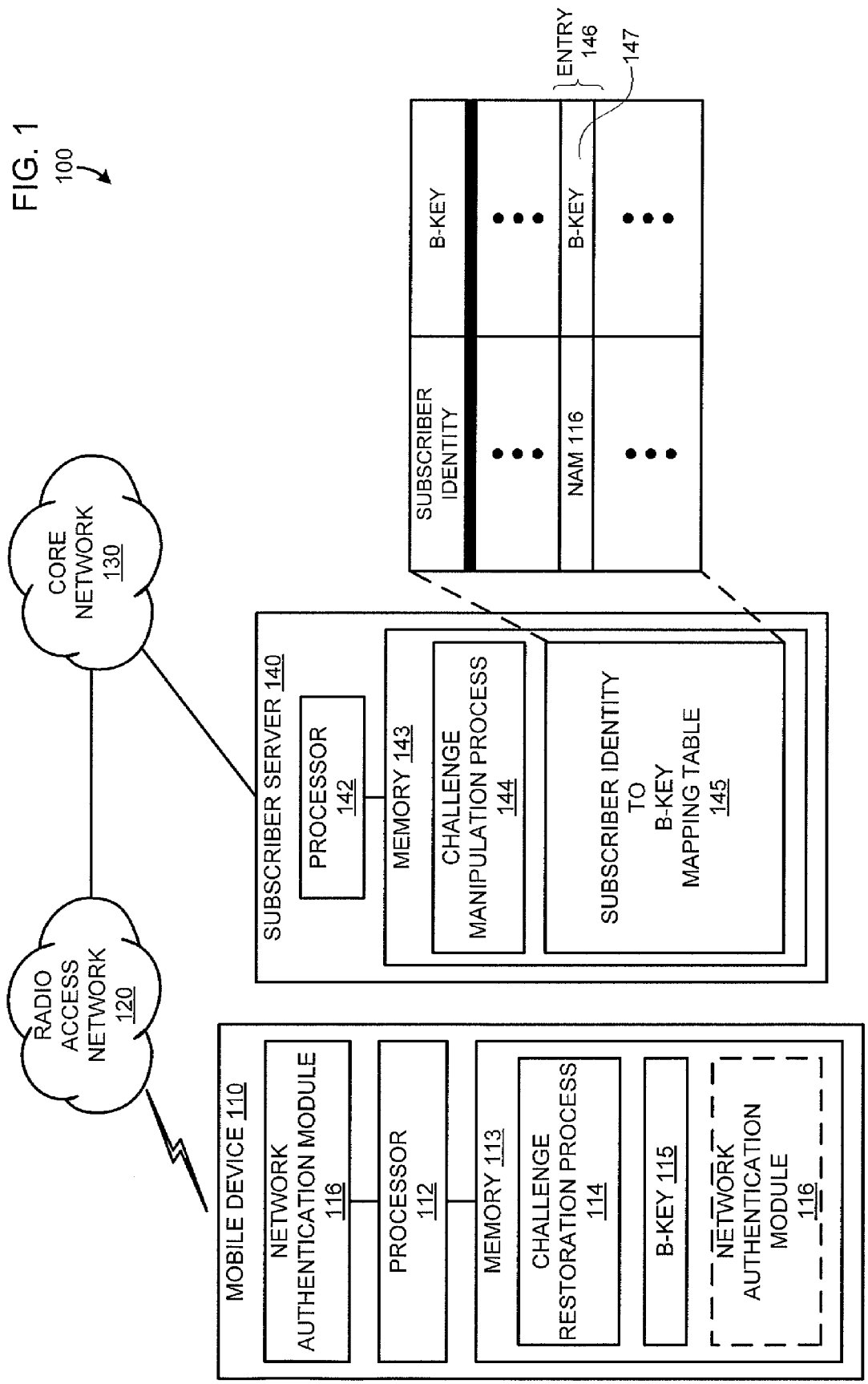
FIG. 1 depicts a high-level block diagram of an exemplary wireless communication system.

In general, a response validation capability is provided for ensuring validation of a response to an authentication challenge during a network authentication procedure.

In at least some embodiments, the response validation capability ensures possession by a mobile device of a subscription secret through validation of a response to an authentication challenge parameter used for authentication of a network authentication module of the mobile device when the mobile device attaches to a wireless network. The authentication challenge parameter is associated with the authentication event in such a way that modification of the authentication challenge parameter will cause an authentication failure such that the mobile device is prevented from accessing the wireless network (namely, modification of the authentication challenge parameter will cause computation of an incorrect authentication response by the network authentication module of the mobile device such that, when the authentication response is provided to the wireless network, the validation of the authentication response fails and the mobile device is prevented from accessing the wireless network). In at least some embodiments, the response validation capability uses a binding key (referred to herein as a B-KEY), which is provisioned on a mobile device and on a subscriber server, to encrypt and decrypt an authentication challenge parameter that is used for authentication of a network authentication module of the mobile device with a wireless access network.

In at least some embodiments, the subscriber server is configured to perform cryptographic manipulation of an authentication challenge parameter before the authentication challenge parameter is provided from the subscriber server to the mobile device for subscription authentication. The authentication challenge parameter is associated with a specific authentication event in which an attempt is made to authenticate a subscription associated with the network authentication module of a mobile device. The cryptographic manipulation of the authentication challenge parameter may include encryption of the authentication challenge parameter (e.g., using the B-KEY as the encryption secret) or any other suitable type of manipulation.

In at least some embodiments, an authorized mobile device is configured to perform reverse cryptographic manipulation of an authentication challenge parameter before the received authentication challenge parameter is presented to the network authentication module of the mobile device for generating a response to the authentication challenge. The reverse cryptographic manipulation of the authentication challenge parameter may include decryption of the authentication challenge parameter (e.g., using the B-KEY as the decryption secret) or any other suitable type of manipulation.

In at least some embodiments, the response validation capability supports restricting the use of a network authentication module (e.g., a smart card, a software-based network authentication module, or the like) to a mobile device authorized to use the network authentication module. In the case of a smartcard (or any other type of physically removable network authentication module), such embodiments ensure that the network authentication module cannot be improperly used in a mobile device that is not authorized to use the network authentication module. In the case of a software-based network authentication module, this ensures that the software-based network authentication module of a mobile device cannot be used to access the network if the response generated by the software-based network authentication module based on the authentication challenge parameter is invalid.

It is noted that, although primarily depicted and described herein within the context of embodiments in which the response validation capability is provided within specific types of wireless networks (namely, within cellular-based wireless networks), the response validation capability may be provided in any other suitable types of wireless networks.

It is noted that, although primarily depicted and described herein within the context of embodiments in which the response validation capability is provided within specific types of security frameworks (namely, within networks using Authentication and Key Agreement (AKA)-based authentication procedures), the response validation capability may be used within any security framework that is based on a challenge-response protocol.

FIG. 1 depicts a high-level block diagram of an exemplary wireless communication system.

The exemplary wireless communication system 100 supports network authentication procedures. The network authentication procedures may be challenge-response authentication procedures, which may be AKA-based authentication procedures which use Authentication Vectors (AVs) during network authentication. For example, the exemplary wireless communication system 100 may be a Second Generation (2G) cellular network (e.g., a 2G Global System for Mobile (GSM) cellular network, a 2G Code Division Multiple Access (CDMA) cellular network, or the like), a Third Generation (3G) cellular network (e.g., a 3G CDMA2000 network, a 3G Partnership Project (3GPP) Universal Mobile Telecommunication System (UMTS) network, or the like), a Fourth Generation (4G) cellular network (e.g., a Long Term Evolution (LTE) network), or the like.

The exemplary wireless communication system 100 includes a mobile device (MD) 110, a Radio Access Network (RAN) 120, a Core Network (CN) 130, and a Subscriber Server (SS) 140.

The MD 110 is a mobile device configured to support challenge-response authentication procedures, which may be AKA-based authentication procedures.

The MD 110 includes a processor 112 and a memory 113 that is communicatively connected to the processor 112. The memory 113 stores various programs and data, including a challenge restoration process 114 and a B-KEY value 115. The processor 112 is configured to retrieve challenge restoration process 114 from memory 113 and execute the challenge restoration process 114 to provide functions of the response validation capability. The challenge restoration process 114 is configured to decrypt an encrypted authentication challenge parameter of an AV received at the MD 110 during a network authentication procedure, where the encrypted authentication challenge parameter is decrypted using the B-KEY 115 that is maintained on the MD 110 (and also provisioned on SS 140 and used by SS 140 to encrypt the authentication challenge parameter before the AV is sent to the MD 110). The operation of challenge restoration process 114 is described in additional detail below.

The MD 110 includes a network authentication module (NAM) 116. The NAM 116 is configured to support challenge-response authentication procedures, which may be AKA-based authentication procedures.

The NAM 116 is associated with a network subscription of a subscriber. The NAM 116 ensures integrity and security of personal data of the subscriber using MD 110. The NAM 116 includes subscription credentials (e.g., a subscriber identity, such as an International Mobile Subscriber Identity (IMSI), a Temporary Mobile Subscription Identity (TMSI), a Globally Unique Temporary Identity (GUTI), or the like), one or more subscription secrets, one or more algorithms for subscription authentication and generation of security keys for protecting session information, and the like.

As depicted in FIG. 1, NAM 116 may be implemented in any suitable manner, which may depend on the underlying Radio Access Technology (RAT) of the RAN 120.

In one embodiment, as depicted in FIG. 1, the NAM 116 is a physically removable device that is inserted into MD 110. In this embodiment, the NAM 116 may be a smartcard. In the case of a GSM network, for example, the NAM 116 may be a Subscriber Identity Module (SIM) card. In the case of a UMTS network or an LTE network, for example, the NAM 116 may be a Universal Integrated Circuit Card (UICC). The NAM 116 may be any other suitable type of card or device. In such embodiments, for example, NAM 116 may include a Central Processing Unit (CPU), Read-Only Memory (ROM), Random Access Memory (RAM), input-output (I/O) circuits, or the like (which elements are omitted for purposes of clarity).

In one embodiment, as depicted in FIG. 1, the NAM 116 is a software-based module stored within MD 110 (e.g., in the memory 113 or in any other suitable storage location within MD 110).

The NAM 116 supports one or more applications, at least some of which may depend on the underlying RAT (e.g., a CDMA Subscriber Identity Module (CSIM) application for a CDMA2000 network, a UMTS Subscriber Identity Module (USIM) application for a UMTS network or an LTE network, or the like).

The typical configuration and operation of a NAM, such as NAM 116, will be understood by one skilled in the art.

The MD 110 has an equipment identity associated therewith. The equipment identity of MD 110 may depend on the RAT of RAN 120. For example, MD 110 may have an International Mobile Equipment Identifier (IMEI) or Mobile Equipment Identifier (MEID) associated therewith. In cases in which the MD 110 is required to provide its equipment identity as part of the network authentication procedure, the manner in which MD 110 provides its equipment identity to the RAN 120 may depend on the RAT of RAN 120. For example, the MD 110 may provide its equipment identity (e.g., IMEI, MEID, or the like) in the initial Attach Request sent by the MD 110 to RAN 120, or the equipment identity of the MD 110 may be requested from MD 110 by RAN 120 in a separate transaction.

The NAM 116 has a subscriber identity associated therewith. The subscriber identity of NAM 116 may depend on the RAT of RAN 120. For example, NAM 116 may have one or more subscriber identities (e.g., an International Mobile Subscriber Identity (IMSI), a Temporary Mobile Subscription Identity (TMSI), a Globally Unique Temporary Identity (GUTI), or the like) associated therewith. The manner in which MD 110 provides the subscriber identity of NAM 116 during the network authentication procedure may depend on the RAT of RAN 120. For example, the MD 110 may provide the IMSI of NAM 116 in the initial Attach Request sent by the MD 110 to the RAN 120, or the MD 110 may provide the TMSI or the GUTI in the initial Attach Request (with the IMSI subsequently being resolved by the RAN 120).

It will be appreciated that, although omitted for purposes of clarity, MD 110 may include various other modules and functions typically supported by mobile devices (e.g., a mobile operating system, one or more network interfaces to one or more types of wireless access networks, one or more client modules (e.g., a camera client module, a video client module, or the like), a battery, and the like).

The RAN 120 and CN 130 may support any suitable type of wireless communications. For example, RAN 120 and CN 130 may support one or more of 2G cellular communications, 3G cellular communications, 4G cellular communications, or the like, as well as various combinations thereof. The RAN 120 provides a wireless access interface for MD 110, supporting communications between MD 110 and CN 130. The RAN 120 supports network authentication procedures. The typical operation of RAN 120 and CN 130 will be understood by one skilled in the art.

The SS 140 is configured to provide security and authentication functions for authenticating mobile devices accessing RAN 120 (illustratively, MD 110). For example, SS 140 may be implemented as a Home Location Register (HLR) (e.g., in a GSM network), as a Home Subscriber Server (HSS) (e.g., in a UMTS network), or the like, as well as various combinations thereof.

The SS 140 includes a processor 142 and a memory 143. The memory 143 stores various programs and associated data. More specifically, the memory 143 stores a challenge manipulation process 144 and a subscriber identity to B-KEY mapping table 145. The processor 142 is configured to retrieve challenge manipulation process 144 from memory 143 and execute the challenge manipulation process 144 to provide functions of the response validation capability. The challenge manipulation process 144 is configured to encrypt an authentication challenge parameter that is generated by SS 140 in response to an AV request received from RAN 120 for MD 110 when MD 110 is requesting to attach to RAN 120, where the authentication challenge parameter is encrypted using a B-KEY that is retrieved from the subscriber identity to B-KEY mapping table 145 based on a subscriber identity of the NAM 116 of MD 110 (and also provisioned on MD 110 and used by MD 110 to decrypt the authentication challenge parameter received by the MD 110 as part of the AV). The operation of challenge manipulation process 144 is described in additional detail below. It is noted that, although primarily depicted and described as being part of SS 140, the challenge manipulation process 144 may be implemented as an adjunct process or an adjunct module associated with or otherwise capable of communicating with SS 140 (e.g., as a process on another device, as a standalone device, or the like, as well as various combinations thereof).

The subscriber identity to B-KEY mapping table 145 includes subscriber identity to B-KEY mapping information, including an entry 146 associated with NAM 116 that includes a mapping of the subscriber identity of NAM 116 to a B-KEY 147. It is noted that, although primarily depicted and described with respect to embodiments in which the subscriber identity to B-KEY mapping information is maintained separate from other information maintained by SS 140, the subscriber identity to B-KEY mapping information may be maintained in any other suitable manner (e.g., via inclusion in one or more existing tables of SS 140 (which are omitted for purposes of clarity), as part of challenge manipulation process 144, or the like, as well as various combinations thereof). It is noted that, although primarily depicted and described herein with respect to embodiments in which the subscriber identity to B-KEY mapping table 145 is stored in a memory within SS 140 (illustratively, memory 143), the subscriber identity to B-KEY mapping table 145 may be maintained using one or more databases associated with SS 140. The subscriber identity to B-KEY mapping information may be maintained and made accessible to SS 140 in any other suitable manner.

The exemplary wireless communication system 100 is configured to support AKA-based authentication procedures which use embodiments of the response validation capability.

The MD 110 initiates a service attach procedure in which the MD 110 attempts to attach to RAN 120. The MD 110 determines a subscriber identity associated with the NAM 116 of MD 110. The MD 110 sends an initial attach request to the RAN 120. The type of subscriber identity that is provided to RAN 120 by MD 110 (and, the manner in which the subscriber identity is provided to RAN 120 by MD 110) may depend on the access protocol being used by MD 110, which may in turn depend on the RAT of RAN 120.

The RAN 120, in response to receiving the initial attach request from MD 110, proceeds with the AKA-based authentication procedure as specified in the standard(s) applicable to the RAN 120. The RAN 120, as part of the authentication procedure, sends an AV request to SS 140. The AV request includes the subscriber identity of the NAM 116 of MD 110.

The SS 140 receives the AV request from the RAN 120. The SS 140 obtains the AV in response to the AV request from the RAN 120. In general, a standard AV includes an authentication challenge parameter, an expected response, and one or more other parameters (e.g., one or more Session Keys, an Authentication Token, or the like, as well as various combinations thereof). The numbers and types of parameters included within the AV may depend on the underlying RAT of RAN 120. In the case of a GSM network, for example, the generated AV may include a RAND parameter (i.e., the authentication challenge parameter), a signed response (SRES) (i.e., the expected response), and a Session Key. In the case of a UMTS network, for example, the generated AV may include a RAND parameter (i.e., the authentication challenge parameter), an XRES (i.e., the expected response), Session Keys (including a Ciphering Key (CK) and an Integrity Key (IK)), and an Authentication Token (AUTN). The parameters typically included within AVs of various RATs will be understood by one skilled in the art. In the case of an LTE network, for example, the generated AV may include a RAND parameter (i.e., the authentication challenge parameter), an XRES (i.e., the expected response), a Session Key (KASME), and an Authentication Token (AUTN). In each case, the AV includes the authentication challenge parameter.

The SS 140, before providing an AV response (including the generated AV having the original authentication challenge parameter) to the RAN 120, executes the challenge manipulation process 144. The challenge manipulation process 144 supports cryptographic manipulation of the original authentication challenge parameter. The challenge manipulation process 144 determines the subscriber identity of the NAM 116 of MD 110, retrieves the B-KEY 147 that is associated with the subscriber identity of the NAM 116 of MD 110, encrypts the original authentication challenge parameter based on the B-KEY 147 in order to form an encrypted authentication challenge parameter, and replaces the original authentication challenge parameter in the AV with the encrypted authentication challenge parameter in the AV.

The challenge manipulation process 144 retrieves the B-KEY 147 that is associated with the subscriber identity of the NAM 116 from the subscriber identity to B-KEY mapping table 145, using the subscriber identity of NAM 116 as a key into the subscriber identity to B-KEY mapping table 145.

The challenge manipulation process 144 encrypts the original authentication challenge parameter using a cipher that takes B-KEY 147 as a secret. The challenge manipulation process 144 may use any suitable cipher in order to encrypt the authentication challenge parameter. For example, the challenge manipulation process 144 may use the Advanced Encryption Standard (AES), SNOW3G, KASUMI, or the like. The cipher that is used by challenge manipulation process 144 of SS 140 corresponds to the cipher used by the challenge restoration process 114 of MD 110 to decrypt the encrypted authentication challenge parameter.

It is noted that the SS 140 does not require the equipment identity of the MD 110; rather, SS 140 simply assumes (based on presence of the B-KEY 147 in the entry 146 that is associated with the NAM 116 of the MD 110) that the MD 110 that is currently being used with the NAM 116 is provisioned with the correct B-KEY.

The SS 140 sends the updated AV including the encrypted authentication challenge parameter to RAN 120 and the RAN 120 delivers the updated AV including the encrypted authentication challenge parameter to MD 110.

The MD 110 receives the updated AV including the encrypted authentication challenge parameter. The MD 110 detects that the encrypted authentication challenge parameter needs to be decrypted in order to recover the original authentication challenge parameter such that the original authentication challenge parameter may be provided to NAM 116. The MD 110 executes the challenge restoration process 114 in order to decrypt the encrypted authentication challenge parameter and, thus, recover the original authentication challenge parameter. The challenge restoration process 114 retrieves the B-KEY 115 from memory 113 and decrypts the encrypted authentication challenge parameter based on B-KEY 115. The challenge restoration process 114 decrypts the encrypted authentication challenge parameter based on B-KEY 115 using a cipher that takes B-KEY 115 as a secret. The cipher that is used by challenge restoration process 114 of MD 110 corresponds to the cipher used by the challenge manipulation process 144 of SS 140 to encrypt the original authentication challenge parameter).

The processor 112 provides the original authentication challenge parameter to NAM 116. The processor 112 may provide the original authentication challenge parameter to NAM 116 in any suitable manner. For example, the processor 112 may replace the encrypted authentication challenge parameter with the original authentication challenge parameter in the AV and provide the AV including the original authentication challenge parameter to NAM 116, such that NAM 116 may perform the normal AKA authentication computations. For example, the processor 112 may provide the original authentication challenge parameter (and, optionally, any other required parameters from the AV and/or computed from the AV) to NAM 116, such that NAM 116 may perform the normal AKA authentication computations. The processor 112 may provide the original authentication challenge parameter to NAM 116 in any other suitable manner.

The NAM 116 receives the original authentication challenge parameter and any other required parameters from processor 112. The NAM 116 performs normal AKA-based authentication computations using the original authentication challenge parameter and any other required parameters. The NAM 116 determines parameters to be returned to the processor 112 of MD 110, including a response (RES) to the AV received at MD 110. The parameters determined by NAM 116 may depend on the underlying RAT of RAN 120. In the case of a GSM network, for example, the returned parameters may include the RES and a Session Key. In the case of a UMTS network, for example, the returned parameters may include the RES and the Session Keys (including a CK and an IK). In the case of an LTE network, for example, the returned parameters may include the RES and a Session Key (KASME). The parameters typically returned by the NAM 116 to the MD 110 for various RATs will be understood by one skilled in the art.

The processor 112 receives the returned parameters, including the RES, from the NAM 116. The processor 112 propagates the RES to the RAN 120. The RAN 120 validates the RES in the usual manner (e.g., via a comparison of one or more parameters of the RES received from the MD 110 to one or more parameters of the AV received from SS 140). The successful validation of the RES by RAN 120 results in successful authentication of MD 110 and the MD 110 is permitted to attach to RAN 120. The unsuccessful validation of the RES by RAN 120 results in an authentication failure for MD 110 and MD 110 is prevented from attaching to RAN 120.

As noted above, in order to support encryption and decryption of the authentication challenge parameter, a secret B-KEY is provisioned into SS 140 and MD 110 for use as a key for encryption and decryption. It will be appreciated that the B-KEY values provisioned into SS 140 and MD 110 correspond to each other (e.g., B-KEY 147 of SS 140 is the same as B-KEY 115 of MD 110). In the case of a physically removable NAM 116, this ensures that, if the NAM 116 is removed from MD 110 and placed into a different MD having a B-KEY that is different than the B-KEY 147 of SS 140, the different MD will not properly decrypt the encrypted authentication challenge parameter and, thus, the different MD will not be authenticated by RAN 120. In the case of a software-based NAM 116, this ensures that if the NAM 116 is hacked, the MD 110 will not be authenticated by the RAN 120. The provisioning of the same B-KEY value on MD 110 and SS 140 may be used to prevent or mitigate various other types of security threats.

The B-KEY value may be determined in any suitable manner (e.g., using any suitable value) and, similarly, may be provisioned into SS 140 (namely, as B-KEY 147) and MD 110 (namely, as B-KEY 115) in any suitable manner.

In one embodiment, for example, the B-KEY value may be a pre-provisioned random number or string. The pre-provisioning of the B-KEY value into MD 110 may be performed during device manufacturing, by the operator (or an affiliated entity) prior to deployment, using one or more device management mechanisms (e.g., Open Mobile Alliance—Device Management (OMA-DM)), or the like.

In one embodiment, for example, the B-KEY value may be a string (e.g., a key, password, or the like) that is provisioned into MD 110 during a bootstrapping procedure, while the same B-KEY is provisioned into SS 140 via a potentially proprietary mechanism (e.g., using an offline provisioning method).

In one embodiment, for example, the B-KEY value may be the output of a hash function. In this embodiment, the hash function may utilize any suitable input(s), such as one or more of (1) a random value, (2) a device-specific identity and/or parameter (e.g., an IMEI, a Media Access Control (MAC) address, a serial number, a model number, or the like, as well as various combinations thereof), or the like, as well as various combinations thereof.

In one embodiment, for example, the B-KEY value may be a number or string chosen using proprietary criteria.

The B-KEY value may be determined and provisioned into MD 110 and SS 140 in any other suitable manner.

In the foregoing description, an assumption is made that the MD 110 is authorized to use the NAM 116. The B-KEY 147 maintained in SS 140 is the same as the B-KEY 115 maintained in the MD 110 and, thus, the original authentication challenge parameter that is encrypted by SS 140 is correctly decrypted by MD 110 such that NAM 116 performs network authentication on the basis of the correct authentication challenge parameter and generates the correct RES and, therefore, the RAN 120 successfully validates the MD 110.

In the case in which NAM 116 is a physically removable device that has been inserted into MD 110, if the NAM 116 were to be removed from MD 110 and placed in an unauthorized MD which does not include the correct B-KEY value, an attempt to attach to RAN 120 using the unauthorized MD would result in an incorrect decrypting of the encrypted authentication challenge parameter, which would result in an incorrect RES and, therefore, an authentication failure. In this manner, the NAM 116 is restricted from being used in any MD other than MD 110 for which it is authorized.

In the case in which NAM 116 is a software-based module stored within MD 110, if the NAM 116 were to be hacked, an attempt to attach to RAN 120 using the MD 110 would result in an incorrect decrypting of the encrypted authentication challenge parameter, which would result in an incorrect RES and, therefore, an authentication failure. In this manner, the NAM 116 is protected from being hacked.

Thus, only an authorized mobile device possessing the correct B-KEY value for a NAM can properly decrypt the authentication challenge parameter such that the NAM can generate the proper RES and the mobile device can be successfully authenticated by the RAN. In this manner, a subscription-specific NAM is securely bound to an authorized mobile device under the full control of the Wireless Operator.

As noted above, various functions associated with manipulation and restoration of the authentication challenge parameter may be performed by SS 140 and MD 110. The functions performed by the SS 140 and the MD 110 for manipulating and restoring the authentication challenge parameter may be better understood by way of reference to FIG. 2 and FIG. 3, respectively.

Figure 2:
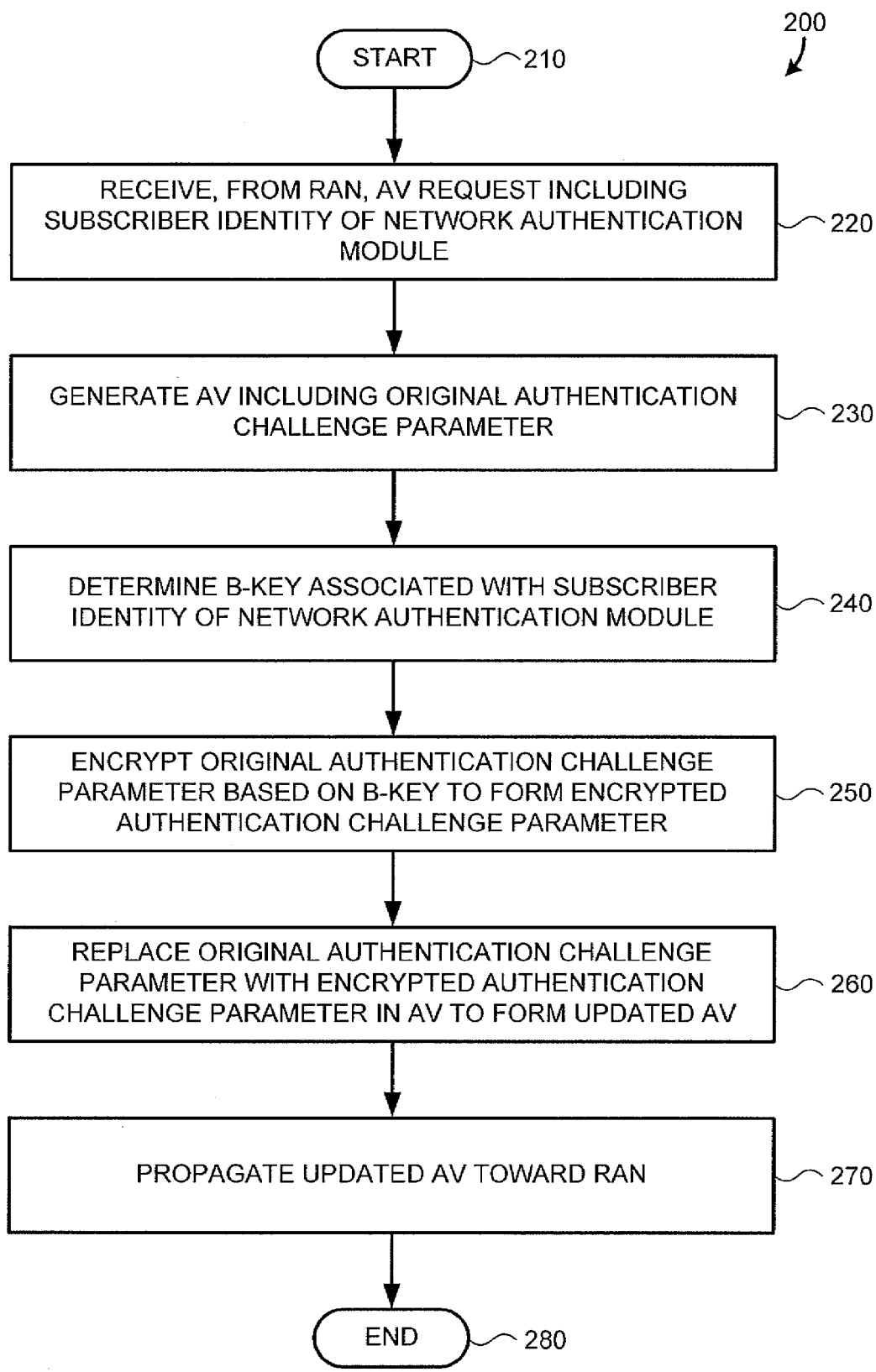
FIG. 2 depicts one embodiment of a method for use by a subscriber server to encrypt an authentication challenge parameter used for authentication, with a network, of a subscription.

FIG. 2 depicts one embodiment of a method for use by a subscriber server to encrypt an authentication challenge parameter used for authentication, with a network, of a subscription. The MD is associated with a RAN, which is capable of communicating with an SS. The subscription is associated with a NAM of an MD. At step 210, the method 200 begins. At step 220, an AV request is received from the RAN. The AV request includes a subscriber identity of the NAM of the MD. At step 230, an AV is generated. The AV includes an original authentication challenge parameter. At step 240, a B-KEY associated with the NAM is determined based on the subscriber identity of the NAM. At step 250, the original authentication challenge parameter is encrypted, using a cipher based on the B-KEY, to form an encrypted authentication challenge parameter. The B-KEY that is used to encrypt the original authentication challenge parameter on the SS corresponds to a B-KEY to be used to decrypt the authentication challenge parameter on the MD (e.g., the B-KEYs are identical). At step 260, the original authentication challenge parameter is replaced with the encrypted authentication challenge parameter in the AV to form an updated AV. At step 270, the updated AV is propagated toward the RAN. At step 280, method 200 ends. It is noted that the operation of method 200 of FIG. 2 may be better understood when considered in conjunction with FIG. 1.

Figure 3:
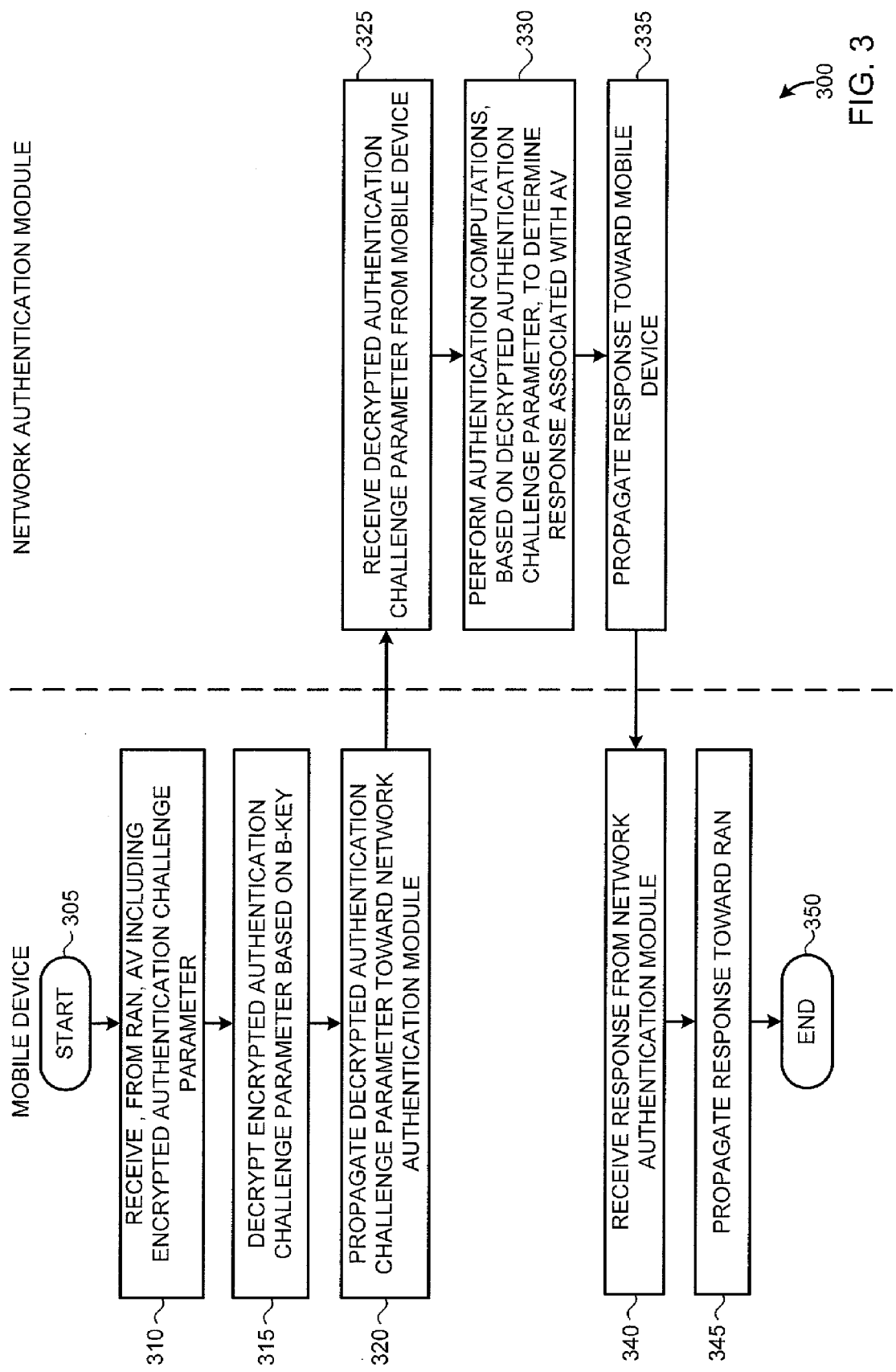
FIG. 3 depicts one embodiment of a method for use by a mobile device to decrypt an authentication challenge parameter used for authentication, with a network, of a subscription.

FIG. 3 depicts one embodiment of a method for use by a mobile device to decrypt an authentication challenge parameter used for authentication, with a network, of a subscription. The MD includes a NAM. The MD is associated with a RAN, which is capable of communicating with an SS. As depicted in FIG. 3, a portion of the steps are performed by the MD and a portion of the steps are performed by the NAM of the MD. At step 305, the method 300 begins. At step 310, the MD receives an AV from the RAN. The AV is received in response to an Attach Request sent from the MD to the RAN. The AV includes an encrypted authentication challenge parameter. At step 315, the MD decrypts the encrypted authentication challenge parameter using a cipher based on a B-KEY that is stored on the MD. The B-KEY that is used by the MD to decrypt the encrypted authentication challenge parameter corresponds to the B-KEY that is used by the SS to encrypt the authentication challenge parameter (e.g., the B-KEYs are identical). At step 320, the MD propagates the decrypted authentication challenge parameter toward the NAM. At step 325, the NAM receives the decrypted authentication challenge parameter from the MD. At step 330, the NAM performs authentication computations, based on the decrypted authentication challenge parameter, to determine a RES associated with the AV. At step 335, the NAM propagates the RES toward the MD. At step 340, the MD receives the RES from the NAM. At step 345, the MD propagates the RES toward the RAN. At step 350, method 300 ends. It is noted that the operation of method 300 of FIG. 3 may be better understood when considered in conjunction with FIG. 1.

Returning now to FIG. 1, it is noted that, although primarily depicted and described herein with respect to embodiments in which the response validation capability is used during authentication, the response validation capability also may be used during re-authentication performed in response to a synchronization failure. In a rare case of a synchronization failure, the value of the authentication challenge parameter that is used by the NAM 116 for the authentication computations to generate the RES (i.e., the decrypted authentication challenge parameter) is not reported back to the RAN 120. Rather, only an authentication token (e.g., an AUTS token as defined in RFC 3310) is sent to the RAN 120 by the NAM 116 via the MD 110, where the authentication token includes the expected value of the authentication synchronization parameter. The RAN 120 associates the received authentication token with the last used value of the authentication challenge parameter that was used during the previous authentication (i.e., the encrypted authentication challenge parameter) and provides the authentication token with the associated authentication challenge value to the SS 140. The SS 140 (e.g., challenge manipulation process 144 or any other suitable process) decrypts the encrypted authentication challenge parameter before SS 140 regenerates the AV for re-synchronization. In other words, the encrypted authentication challenge parameter received by the SS 140 from the RAN 120 in the synchronization failure transaction needs to be recovered (e.g., decrypted) before association with the original authentication parameter is restored and re-synchronization may be achieved. The decryption of the encrypted authentication challenge parameter to recover the original authentication challenge parameter uses the same cipher that was used to encrypt the original authentication challenge parameter during the previous authentication of the NAM 116. Similarly, the decryption of the encrypted authentication challenge parameter to recover the original authentication challenge parameter uses the same B-KEY that was used to encrypt the original authentication challenge parameter during the previous authentication of the NAM 116 (i.e., the B-KEY associated with the subscriber identity of the NAM 116). In other words, during re-synchronization, the SS 140 performs processing similar to that performed by the MD 110 during authentication.

It is noted that various embodiments of the response validation capability may be particularly useful within the context of Machine Type Communications (MTC). MTC is being defined by multiple standardization bodies to allow Wireless Operator support for Machine-to-Machine (M2M) communications. In general, M2M communications include communications by wireless devices without human interaction. It is increasingly expected that wireless devices involved in M2M communications, typically referred to as MTC devices or M2M devices, will be based on typical wireless mobile platforms while maximizing the use of existing wireless radio access and core network technologies. In other words, M2M/MTC-specific modifications to the commercial wireless architecture and infrastructure are expected to be reduced to a minimum. However, specifics of MTC/M2M feature operation require that a NAM associated with an MTC/M2M subscription can only be used in mobile devices that are specially designed as MTC/M2M devices and/or authorized to perform the M2M/MTC functions. Various embodiments of the response validation capability are adapted to restrict a NAM associated with an MTC/M2M subscription to a mobile device that is equipped to perform MTC/M2M functions and/or that is authorized to perform MTC/M2M functions. Various embodiments of the response validation capability are adapted to restrict the access of a NAM that is dedicated to be used only with MTC/M2M modules associated with a specific billing plan. Various embodiments of the response validation capability support the requirement, defined in 3GPP TS 22.368 ($3^{rd}$ Generation Partnership Project; Technical Specification Group Services and System Aspects; Service requirements for Machine-Type Communications (MTC); Stage 1 (Release 11)), which restricts the use of a USIM to specific MTC/M2M devices (as well as similar requirements which may be specified in other standards, e.g., 3GPP2 S.P0146-0 Version 0.50 (Machine-to-Machine Communication System Requirements, Stage 1 Requirements, February 2012) or the like). In one embodiment, a specially equipped or authorized MTC/M2M device is provisioned with a secret B-KEY value (associated with one or both of an equipment identity of the specially equipped or authorized MTC/M2M device or a subscriber identity of a NAM of the specially equipped or authorized MTC/M2M device), which is also stored in a database in the network of the home operator for use in post-processing an AV that is generated in the network of the home operator when the specially equipped or authorized MTC/M2M device is authenticated for access to an access network.

It is noted that, although primarily depicted and described herein with respect to embodiments in which the SS computes the AV for the MD when the AV request is received from the RAN, in at least some embodiments the SS may pre-compute and store the AV for the MD prior to receipt of the AV request from the RAN. In this embodiment, the AV associated with the MD may be retrieved by the SS when the AV request is received from the RAN. Thus, the SS may be configured to obtain the AV for the MD when the AV request is received from the RAN, where obtaining the AV for the MD may be considered to include computing the AV when the AV request is received or retrieving the AV when the AV request is received. The pre-computed AV may be stored in any suitable type of storage module (e.g., buffer, cache, or the like). It is noted that the pre-computed AV may include the encrypted authentication challenge parameter or the original authentication challenge parameter.

In one embodiment, the pre-computed and stored AV includes the encrypted authentication challenge parameter. The SS is able to encrypt the original authentication challenge parameter in advance of receipt of the AV, because the SS already maintains the associated information for the NAM (i.e., the subscriber identity, the subscription secret (i.e., B-KEY), and the original authentication challenge parameter). Thus, if the SS has information indicative that the original authentication challenge parameter of a NAM needs to be encrypted, the SS can generate the AV including the encrypted authentication challenge parameter (including performing encryption of the original authentication challenge parameter) and store the AV including the encrypted authentication challenge parameter for later use in responding to a request by an MD to access the RAN. This prevents the SS from having to generate the AV, including encryption of the original authentication challenge parameter to form the encrypted authentication challenge parameter, in real time when the AV request is received. The SS may be configured to compute multiple AVs for multiple subscriptions in advance and to store the pre-computed AVs such that the pre-computed AVs are available for retrieval when the associated MDs access the RAN. The SS may be configured such that, as the AVs are retrieved from the SS in response to AV requests, new AVs including encrypted authentication challenge parameters are computed and stored for use during subsequent accesses by the MDs to the RAN. In this manner, the load on the SS may be averaged over time.

In one embodiment, the pre-computed and stored AV includes the original authentication challenge parameter. In this embodiment, the original authentication challenge parameter is encrypted based on the B-KEY when the AV request is received from the RAN. This embodiment may be useful when post-processing is done in association with a specific MD rather than in association with the NAM (e.g., where the SS does not know in advance the MD into which the NAM is inserted and, thus, must wait until the AV request (including the equipment identity of the MD in addition to the subscriber identity of the NAM) is received).

It is noted that, although primarily depicted and described herein with respect to embodiments in which the AV is provided from the RAN to the MD, in at least some embodiments only a portion of the AV is provided from the RAN to the MD. In one embodiment in which the RAN is a GSM-based network, for example, only the authentication challenge parameter (i.e., RAND) of the AV is provided from the RAN to the MD. In one embodiment in which the RAN is a UMTS-based network, for example, only the authentication challenge parameter (i.e., RAND) and the authentication token (i.e., AUTN) of the AV are provided from the RAN to the MD. In one embodiment in which the RAN is an LTE-based network, for example, only the authentication challenge parameter (i.e., RAND) and the authentication token (i.e., AUTN) of the AV are provided from the RAN to the MD. It is noted that, in each case, at least the authentication challenge parameter of the AV is provided from the RAN to the MD.

It is noted that, although primarily depicted and described herein with respect to embodiments in which it is assumed that the authentication challenge parameter that is provided from the SS to the RAN to the MD is an encrypted authentication challenge parameter, in at least some embodiments the MD may be capable receiving both encrypted authentication challenge parameters and authentication challenge parameters that are not encrypted (e.g., an MD may be capable of supporting multiple subscriptions in which at least one subscription is configured to use an encrypted authentication challenge parameter and at least one subscription is configured to use an unencrypted authentication challenge parameter. In one embodiment, the MD may be configured to determine whether a received authentication challenge parameter is encrypted (i.e., to determine whether the received authentication challenge parameter needs to be decrypted before being provided to the NAM). In one embodiment, the MD is configured to determine whether the received authentication challenge parameter is encrypted based on a subscriber identity. In one embodiment, the MD is configured such that, when a determination is made that the authentication challenge parameter is encrypted, the encrypted authentication challenge parameter is decrypted based on the B-KEY and the decrypted authentication challenge parameter is propagated toward the NAM. In one embodiment, the MD is configured such that, when a determination is made that the authentication challenge parameter is not encrypted, the authentication challenge parameter is propagated toward the NAM. This may be used, for example, within an MD that includes a non-MTC/M2M subscription (e.g., a typical telephone service subscription) and an MTC/M2M subscription (e.g., for a heart rate monitor or any other MTC/M2M application), where (1) each access to the RAN by the non-MTC/M2M subscription results in return of an authentication challenge parameter that is not encrypted and, thus, does not need to be decrypted before being provided to the NAM and (2) each access to the RAN by the MTC/M2M subscription results in return of an authentication challenge parameter that is encrypted and, thus, needs to be decrypted based on the B-KEY before being provided to the NAM. It will be appreciated that this is merely one example of cases in which an MD may be configured to determine whether a received authentication challenge parameter is encrypted. It also will be appreciated that, as primarily depicted and described herein, an MD may be configured such that it is not necessary to determine whether a received authentication challenge parameter is encrypted. It is noted that, although primarily depicted and described herein with respect to embodiments in which the cryptographic manipulation of the authentication challenge parameter is based on encryption and decryption of the authentication challenge parameter, the cryptographic manipulation of the authentication challenge parameter may be based on any other suitable type of cryptographic manipulation.

It is noted that, although primarily depicted and described herein with respect to embodiments in which a NAM is bound to a single authorized MD, in at least some embodiments a NAM may be authorized for use with multiple MDs such that the NAM may be used within any of the multiple MDs without any authentication failures. In one embodiment, this may be provided using a single B-KEY, where the same B-KEY is provisioned into each of the multiple MDs and into the SS (e.g., by mapping the equipment identities of each of the multiple MDs to the same B-KEY value using one or more mapping entries). In one embodiment, this may be provided using multiple B-KEY values associated with the multiple MDs, where each of the multiple MDs has one of the B-KEYs provisioned therein and the B-KEYs are provisioned into the SS and mapped to the multiple MDs, respectively.

It is noted that, although primarily depicted and described herein with respect to embodiments in which an MD has a single NAM associated therewith, in at least some embodiments an MD may have multiple NAMs associated therewith (i.e., multiple NAMs may be used with the MD). In one embodiment, the MD is provisioned with multiple B-KEYs associated with the multiple NAMs which may be used with the MD, respectively. In this embodiment, when the MD receives an AV including an encrypted authentication challenge parameter, the MD selects the appropriate B-KEY to be used to decrypt the encrypted authentication challenge parameter based on the subscriber identity provided to the MD by the NAM during the authentication procedure.

It is noted that, although primarily depicted and described herein with respect to embodiments in which a NAM is bound to one or more MDs in a restricted manner, in at least some embodiments a NAM may be authorized for use with any MD. In this embodiment, the MD is not pre-provisioned with a B-KEY specific to the NAM as the value of the subscriber identity would not be known at the time of provisioning of the MD. Rather, in this embodiment, the MD is pre-provisioned with a B-KEY that is associated to the equipment identity of the MD and, similarly, the equipment identity to B-KEY mapping would be maintained in the associated SS. In this embodiment, the MD 110 would report its equipment identity (in addition to the subscriber identity of the NAM of the MD) and the SS (e.g., challenge manipulation process 144) would use the equipment identity of the MD (rather than the subscriber identity of the NAM of the MD) in order to retrieve the associated B-KEY for the MD for use in encrypting the authentication challenge parameter during authentication of the MD. In this embodiment, the SS (e.g., challenge manipulation process 144) also performs an additional step in order to verify that the equipment identity that is reported by the MD is authorized to be used with the subscriber identity of the NAM that is reported by the MD (e.g., using a subscriber identity to equipment identity mapping table maintained by the SS, or any other suitable source of such mapping information). This verification ensures that the NAM of the MD that is being authenticated is authorized to operate in the MD (i.e., in the device having the equipment identity reported by the MD).

It is noted that, although primarily depicted and described herein with respect to use of the response validation capability within specific types of wireless communication networks (namely, cellular communication networks using AKA-based authentication procedures, such as 2G GSM networks, 2G, CDMA networks, 3G CDMA2000 networks, 3GPP 3G (UMTS) networks, 4G (LTE) networks, or the like), the response validation capability may be used within various other types of wireless communication networks. For example, the response validation capability may be used within a 3G CDMA2000 legacy network (e.g., where the RANDU parameter is encrypted and decrypted), a 1×EV-DO network (e.g., where the CHAP-Challenge parameter is encrypted and decrypted), or the like.

It is noted that, although primarily depicted and described herein with respect to use of the response validation capability within specific types of frameworks (namely, cellular-based communication networks), the response validation capability may be used within any security framework that is based on a challenge-response protocol.

It is noted that various embodiments of the response validation capability require modifications only to mobile devices configured to support network authentication and to the subscriber server (e.g., HLR, HSS, or the like) supporting authentication for such mobile devices, not to other elements (e.g., not to elements of the RAN, not to elements of the CN, and so forth).

Figure 4:
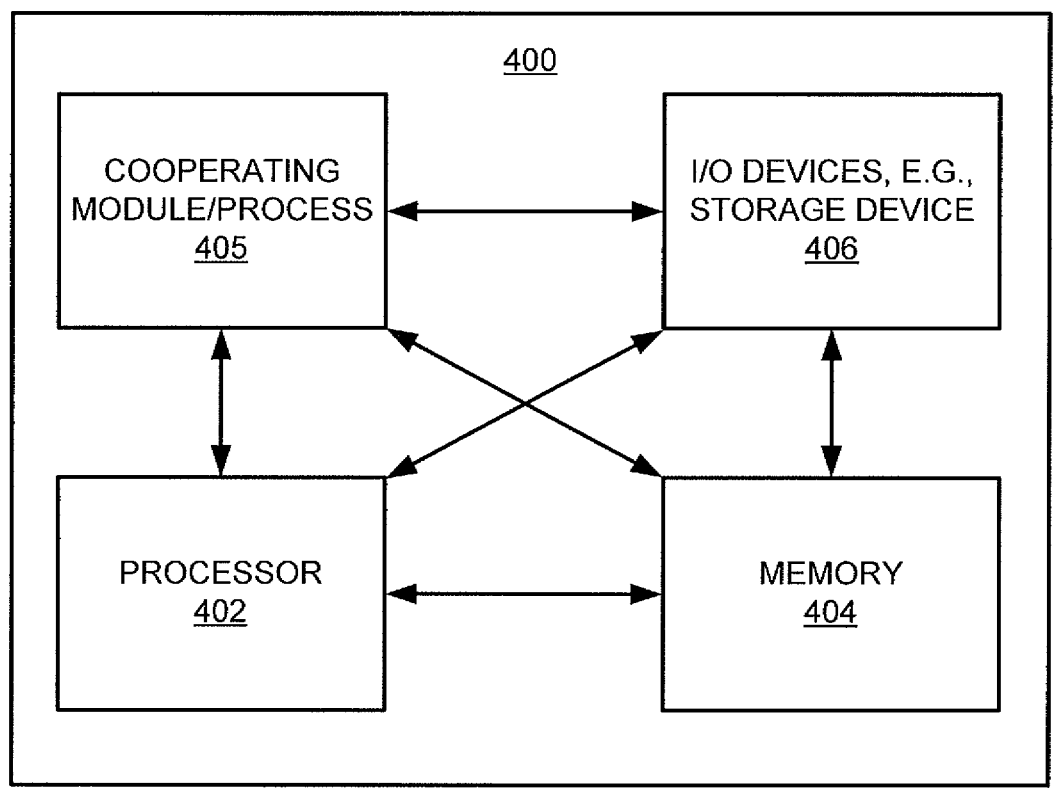
FIG. 4 depicts a high-level block diagram of a computer suitable for use in performing functions described herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of MD 110, NAM 116, an element of RAN 120, a portion of an element of RAN 120, an element of CN 130, a portion of an element of CN 130, SS 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive an equipment identity of a mobile device and a subscriber identity associated with a network authentication module of the mobile device;
determine, based on the subscriber identity associated with the network authentication module of the mobile device and the equipment identity of the mobile device, whether the network authentication module of the mobile device is authorized to be used with the mobile device;
obtain an authentication vector (AV) for the mobile device, the AV including an original authentication challenge parameter;
obtain, based on the equipment identity of the mobile device, a binding key associated with the network authentication module of the mobile device;
encrypt the original authentication challenge parameter of the AV, based on the binding key, to form an encrypted authentication challenge parameter;
replace the original authentication challenge parameter of the AV with the encrypted authentication challenge parameter;
propagate the AV including the encrypted authentication challenge parameter toward a wireless access network supporting the mobile device;
receive, from the wireless access network, a synchronization failure message including an authentication token and the encrypted authentication challenge parameter;
decrypt the encrypted authentication challenge parameter of the synchronization failure message, based on the binding key, to recover the original authentication challenge parameter; and
regenerate the AV for the mobile device based on the original authentication challenge parameter recovered from the synchronization failure message.

2. The apparatus of claim 1, wherein the processor is configured to:
in response to an AV request being received from the wireless access network:
retrieve the AV including the encrypted authentication challenge parameter; and
propagate the AV including the encrypted authentication challenge parameter toward the wireless access network.

3. The apparatus of claim 1, wherein, to obtain the AV including the original authentication challenge parameter, the processor is configured to:
generate the AV including the original authentication challenge parameter; or
retrieve the AV including the original authentication challenge parameter.

4. The apparatus of claim 1, wherein the processor is configured to:
propagate the AV including the encrypted authentication challenge parameter toward the wireless access network.

5. The apparatus of claim 1, wherein the equipment identity of the mobile device comprises an International Mobile Equipment Identity (IMEI) or a Mobile Equipment Identifier (MEID).

6. The apparatus of claim 1, wherein the binding key comprises one of a pre-provisioned random number or string, a string provisioned during a bootstrapping procedure, an output of a hash function, or a string or number.

7. The apparatus of claim 1, wherein the processor is configured to:
receive, from the wireless access network, the encrypted authentication challenge parameter; and
decrypt the encrypted authentication challenge parameter based on the binding key.

8. A method, comprising:
receiving, via a processor, an equipment identity of a mobile device and a subscriber identity associated with a network authentication module of the mobile device;
determining, based on the subscriber identity associated with the network authentication module of the mobile device and the equipment identity of the mobile device, whether the network authentication module of the mobile device is authorized to be used with the mobile device;
obtaining an authentication vector (AV) for the mobile device, the AV including an original authentication challenge parameter;
obtaining, based on the equipment identity of the mobile device, a binding key associated with the network authentication module of the mobile device;
encrypting the original authentication challenge parameter of the AV, based on the binding key, to form an encrypted authentication challenge parameter;
replacing the original authentication challenge parameter of the AV with the encrypted authentication challenge parameter;
propagating the AV including the encrypted authentication challenge parameter toward a wireless access network supporting the mobile device;
receiving, from the wireless access network, a synchronization failure message including an authentication token and the encrypted authentication challenge parameter;
decrypting the encrypted authentication challenge parameter of the synchronization failure message, based on the binding key, to recover the original authentication challenge parameter; and
regenerating the AV for the mobile device based on the original authentication challenge parameter recovered from the synchronization failure message.

* * * * *